United States Patent [19]

Friedmann et al.

[11] 4,446,562
[45] May 1, 1984

[54] METHOD AND APPARATUS FOR MEASURING CRUCIBLE LEVEL OF MOLTEN METAL

[75] Inventors: Paul G. Friedmann, Madison; Frank N. Patris, Flemington; Allan W. Tomalesky, Somerville, all of N.J.

[73] Assignee: Electric Power Rsearch Institute, Inc., Palo Alto, Calif.

[21] Appl. No.: 311,025

[22] Filed: Oct. 13, 1981

[51] Int. Cl.$^3$ .............................................. H05B 5/04
[52] U.S. Cl. ..................................... 373/149; 73/149; 73/290 R
[58] Field of Search ............... 373/139, 145, 147, 148, 373/149, 150; 73/290 R, 149

[56] References Cited

U.S. PATENT DOCUMENTS

| | | | |
|---|---|---|---|
| 3,326,043 | 6/1967 | Roeske et al. | 73/290 R |
| 3,366,873 | 1/1968 | Miller et al. | 324/80 |
| 3,456,715 | 7/1969 | Freedman et al. | 164/155 |
| 3,519,060 | 7/1970 | Vischulis | 164/155 |
| 3,695,107 | 10/1972 | Hertz et al. | 73/290 R |
| 3,962,919 | 6/1976 | Playfoot et al. | 73/290 R |
| 3,987,236 | 10/1976 | Kohler et al. | 373/145 |
| 4,107,448 | 8/1978 | Stut | 373/139 |
| 4,154,283 | 5/1979 | Ray et al. | 164/65 |
| 4,212,342 | 7/1980 | Linder et al. | 164/4 |

Primary Examiner—Roy N. Envall, Jr.
Attorney, Agent, or Firm—King and Liles

[57] ABSTRACT

Improved and simplified measurement of the level of molten metal in a crucible heated by an induction coil utilizes a variable frequency power supply for the induction coil. Power supply frequency is changed to maintain the power provided to the coil substantially constant, independent of variations of power factor in the coil circuit. Detection of the frequency of power supplied to the induction coil provides an indication of the changes in power factor of the coil due to changes in the level of molten metal surrounded by the coil, and thus of the level of the molten metal.

11 Claims, 1 Drawing Figure

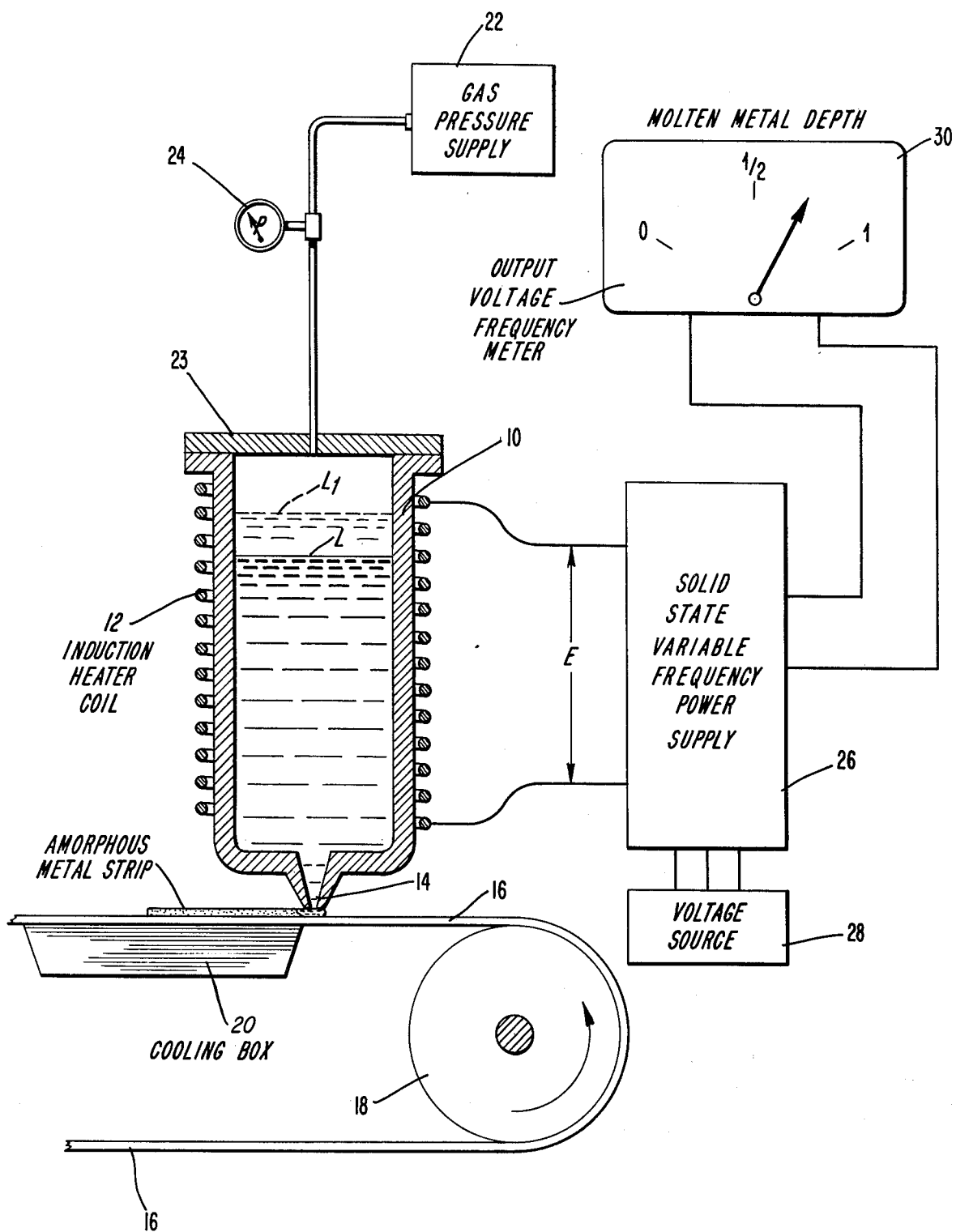

METHOD AND APPARATUS FOR MEASURING CRUCIBLE LEVEL OF MOLTEN METAL

TECHNICAL FIELD

This invention relates to measurement of levels of molten metal in crucibles, and more specifically to measurement of molten metal levels in crucibles heated by induction coils, such as used in continuous casting processes.

BACKGROUND ART

In the metal casting art, molten metal is kept in a heated crucible prior to a casting step in which the metal is ejected through an orifice. In fact, the crucible may serve as the melting vessel for the metal. Proper control of the process requires knowledge of the volume of metal contained in the crucible, as indicated by the level of the melt, for example.

One means for effecting expulsion of the molten metal from the crucible onto a moving chill surface in the casting of a ribbon of amorphous metal strip utilizes the hydrostatic head of the metal, as disclosed in Narasimhan U.S. Pat. No. 4,212,343. Accordingly, it is important to be able to determine the level of the molten metal in such a process.

Referring again to the casting of amorphous metal in thin films, Ray et al U.S. Pat. No. 4,154,283 discloses the use of an induction coil assembly to melt a metal alloy in a crucible. The melt is ejected through an orifice in the bottom of the crucible onto a chill wheel.

In such structures, it is desirable to minimize the amount of equipment necessary for measuring the level of the melt, and any such equipment at the casting machine should preferably be of the type which can be easily added to existing machinery, without requiring substantial modifications thereof.

Prior art level measuring equipment fails to meet these requirements, however.

Vischulis U.S. Pat. No. 3,519,060, for example, utilizes an additional pair of coils encircling the mold of a continuous casting machine to produce oscillations having a frequency dependent on the metal level. The reference notes that as the volume of molten metal within the encircling coils increases, the inductance of each coil decreases and the AC resistance thereof increases, due to increased eddy current losses. In addition to requiring additional coils and an oscillator, the apparatus can only be used in conjunction with a mold formed of separate, discontinuous pieces. As dislcosed in the reference, a continuous mold would prevent the induction of circulating eddy currents in the molten conductor, and it is precisely such eddy current upon which the measuring apparatus relies.

Roeske et al U.S. Pat. No. 3,326,043 requires the use of a plurality of axially aligned coils to measure the level of a conductive liquid. The self inductance of the coils is detected and compared with a reference to determine the changes therein resulting from filling of the tubular spaces within the coils by the liquid.

Hertz et al U.S. Pat. No. 3,695,107 determines the level of a conductive liquid by detecting the pulse repetition rate of a pulse transmitter which is triggered each time a pulse reflection appears at the input end of a delay line submerged in the liquid.

Playfoot et al U.S. Pat. No. 3,962,919 discloses the immersion of a bifilar wound transformer in liquid metal for level detection. The transformer is driven by a constant current power source, and the output voltage induced in the secondary winding varies with the level of the liquid metal about the coil.

Miller et al U.S. Pat. No. 3,366,873 mounts a plurality of elongated, rectangular, stacked coils on the exterior of a non-magnetic containment vessel for molten metal. The voltage induced in some of the coils by a suitably energized center coil is used to provide output signals indicative of the level of molten metal within the vessel.

Linder et al U.S. Pat. No. 4,212,342 uses a transmitter coil to induce an electromagnetic field in a bath of a continuous casting mold. A receiver coil detects the field, and changes in inductance of the coils, which is a function of the bath level, are used to indicate the metal level.

Freedman et al U.S. Pat. No. 3,456,715 discloses a number of other prior art methods for measurement of molten metal level within a continuous casting pipe or mold. For example, radiation absorption by the metal, temperature detection by thermocouples external to the mold, and coupling of acoustic energy to the interior of the container have all been used.

As is apparent from the foregoing summary, prior art measurement of liquid metal levels is typically complex, requiring the use of additional equipment, and would be difficult to apply to a crucible surrounded by an induction heating coil. Simple, straightforward measurement of a molten metal level by equipment used for the casting operation, particularly for heating, is not provided.

DISCLOSURE OF THE INVENTION

It is accordingly an object of the present invention to overcome the difficulties of the prior art and to provide a more efficient method and apparatus for measuring the level of molten metal in a crucible heated by an induction coil.

It is a more specific object of the invention to provide a level detector for an induction heated crucible, in a continuous casting apparatus, which requires no additional equipment to be located at the casting apparatus.

A further object of the invention is the provision of a level detecting system, for molten metal in crucibles heated by induction coils, which may be easily added to existing casting equipment without substantial modification thereof.

Yet another object of the invention is the provision of a method and apparatus for non-contact measurement of the volume of molten metal encased in a crucible heated by an induction coil, particularly for use in a continuous casting apparatus for amorphous magnetic metal alloys.

It is still another object of the invention to provide a method and apparatus for measuring the depth of molten metal in a container heated by an induction coil, which detects frequency variations in power suplied to the coil to determine the depth of the molten metal.

It is a further object of the invention to provide a display of the depth of molten metal in a crucible heated by an induction coil, which utilizes a frequency meter for depth display.

Another object of the invention is the detection of frequency variations in a power supply to compensate for load variations due to changes in depth of molten metal within an induction heater receiving the power, and to display such variations as variations in the depth of the melt.

Yet another object of the invention is the display of depth of molten metal surrounded by an induction heating coil by detection of frequency variations of a power supply which compensates for variations in the power factor of the coil due to changes in the depth of the metal.

In accordance with the foregoing objects, the present invention utilizes a solid state, variable frequency, power supply for an induction coil for a crucible used in a casting operation. As the volume of molten metal enclosed within the volume surrounded by the induction coil changes, the power factor of the induction heater changes. The power supply is provided with means for varying the frequency of the power supplied to the coil in order to maintain the power factor thereof relatively constant. A frequency meter is used to detect the frequency of the power supplied to the heater, and to display the same on a scale calibrated with indicia indicating the depth of the molten metal.

BRIEF DESCRIPTION OF DRAWING

The foregoing and other objects, features and advantages of the invention will become more readily apparent upon reference to the following detailed description of the preferred embodiment, when taken in conjunction with the accompanying drawing, in which the sole FIGURE shows a casting apparatus for amorphous magnetic metal alloys utilizing the invention.

BEST MODE FOR CARRYING OUT THE INVENTION

Although the invention is described with respect to a casting apparatus for amorphous magnetic metal alloys, it is to be understood that the invention is applicable to any process or apparatus in which an induction coil is used as a heater for a volume of molten metal surrounded thereby. The need for more accurate indication of the level of molten metal within a heated crucible is particularly great in casting of amorphous alloys for reasons which will become clear from the following description.

Amorphous magnetic metal alloys have recently begun to be used for wound cores of electromagnetic devices. Such alloys are typically compositions containing at least about 50% amorphous structure, as described in Chen et al U.S. Pat. No. 3,856,513, for example.

As is known in the art, such amorphous metal alloys evidence generally superior properties as compared to conventional polycrystalline metal alloys commonly used as cores of magnetic devices. Some of the advantages of the amorphous alloys include a greater mechanical strength, a lower modulus of rigidity (by a factor of 20%–40%), a higher electrical resistance, high magnetic permeability and no work hardening characteristics. These features are disclosed in Uedaira et al U.S. Pat. No. 4,212,344, for example.

Because the alloys are frequently used in thin films. It is important to observe and/or to control as many parameters of the fabrication process as possible.

A typical casting apparatus for amorphous alloys includes a casting cup, or crucible 10, heated by a surrounding induction coil heater 12. The molten alloy within the crucible is ejected through a nozzle 14 onto an endless belt 16 driven around a roll 18. The belt, which is in contact with a cooling box 20, forms a moving chill surface for the melt ejected from the nozzle 14. It is known that a chill rate of approximately $10^5$ to $10^6$ °C./sec is required for casting the amorphous magnetic metal alloy. In order to assure uniformity of the cast, it is advantageous to maintain the various operational parameters within predetermined ranges, or to compensate for variation of one parameter by altering approximately various other operational parameters.

One such parameter is the depth of the molten metal in the crucible. As previously mentioned, the depth of the melt may be used in effecting the expulsion of the melt from the nozzle 14 onto belt 16. However, even where other means are used to eject the melt through the nozzle, it is clear that the level of the melt within the crucible is a significant factor of the ejection rate. Such other means may use a non-reactive gas, such as argon, supplied from a container 22 through an opening in a cap or cover portion 23 of the crucible to pressurize the volume above the melt, at a pressure set by regulator 24.

Alternatively, it may be necessary to have an accurate indication of the melt level in order to introduce additional alloy materials into the crucible at appropriate times.

In accordance with the present invention, an accurate indication of depth of molten metal is provided with minimal additional equipment.

As has been described by the prior art, changes in the volume of a conductive material contained within an inductive coil affect the inductance and/or resistance of the coil. Various prior art devices have attempted to provide information for molten metal by utilizing various combinations of transmitting and detecting coils, along with special oscillators.

As has also been recognized, changes in the level of molten metal in an induction furnace affects the power factor of the heating circuit. See for example, page 22-65 in Fink and Carrol, Standard Handbook for Electrical Engineering, 10th Edition, McGraw Hill, copyright 1957 and 1968.

Previous corrections of power factor variations in induction furnaces have utilized switched capacitors as shown in Fink and Carroll, supra. An alternative method for correction of power factor variation in an induction heater is the use of variable frequency power supplies, such as available under the model designation MK 14 from the Pillar Corporation of 7000 West Walker Street, West Allis, Wis. 53214.

Such a device, symbolically shown as power supply 26 in the FIGURE, typically converts three-phase AC voltage of voltge source 28 to DE in a rectifying section, and utilizes a variable frequency inverter to provide variable frequency power to induction coil 12. The variable frequency of the power supplied to the induction heater is used to compensate for variation in the impedance of the heater coil, for example.

As changes occur in the load, due to changes in the apparent coil impedance, for example, a control circuit within the supply (not shown) acts to change the frequency of the output voltage thereof. Thus, power is provided to the coil at frequencies closer to, or further removed from resonance of the coil and a power factor correction capacitor.

Operation at frequencies closer to or further from the resonant frequency of a circuit is known to alter the power delivered to the circuit. Thus, with a change in frequency provided by the supply 26 in response to a changed impedance of the coil, the power delivered to the coil is kept constant.

An important part of the present invention, unrecognized in the prior art, is the utilization of a frequency of a signal to provide an indication of an operating condition which affects consumption of power by the induction heating coil. The frequency of the signal, unlike some of the prior art level detectors, does not result from oscillation in an inductive circuit whose inductance changs. Rather, the signal's frequency results from operation of a power supply in producing substantially constant power operation of the coil.

The changing frequency of the power supplied to the induction heating coil may be detected by a frequency meter 30 and corresponding indicia may be displayed thereon (such indicia not shown in the FIGURE). The meter may be connected directly to the output of power supply 26, or to an internal circuit thereof for measurement of the operating frequency. The meter may also be provided, as shown in the FIGURE, with indicia calibrated to indicate the depth of the molten metal. It is recognized that as the volume of metal enclosed within the volume of the induction coil changes, the resulting change in display (indicating a change from $L_1$ to L, for example) may not be linearly related to the change in frequency. Thus the meter dial may be provided with specially calibrated indicia to indicate metal depth, which indicia may not be linearly related to the frequency measuring indicia also provided.

It is also recognized that signals indicative of frequency change, rather than of absolute operating frequency, may be provided on an additional output device, such as a computer, thus to indicate change in depth of molten metal within the crucible.

Moreover, the signals need not necessarily activate a meter display. Instead, it is appreciated that various other displays may be used, such as warning lights, warning bells, or other audio or visual alarms. Still a further modification within the scope of the invention is the use of signals indicative of frequency change in power supplied to the induction coil for controlling various process parameters of the casting operation. The frequency indicating signals may be input to a process controlling computer, for example.

Further, it is understood that the system described herein is responsive to volume of molten metal within an induction coil used as a heater. The system may be described as a level sensitive or as a volume sensitive device, since volume is proportional to the depth or level of molten metal enclosed therein.

The preceding specification describes, by way of illustration and not of limitation, a preferred embodiment of the invention. It is appreciated that equivalent variations and modifications of the invention will occur to those skilled in the art. Such modifications, variations and equivalents are within the scope of the invention as recited with greater particularity in the appended claims, when interpreted to obtain the benefits of all equivalents to which the invention is fairly and legally entitled.

We claim:

1. Level measurement apparatus for molten metal in a crucible heated by an induction coil comprising:
   (a) variable frequency means for regulating power dissipated by said induction coil by variation of the frequency of power supplied thereto; and
   (b) frequency detecting means for detecting the frequency of said variable frequency means,
   whereby variations in power dissipation due to changes in metal level within said crucible which are compensated by variations of the frequency of said variable frequency means are detected to provide information concerning such level changes.

2. The apparatus of claim 1 further comprising indicating means for providing an indication of said changes in said metal level, said indicating means responsive to said frequency detecting means.

3. The apparatus of claim 2 wherein said indicating means further includes means for indicating the level of said metal within said crucible.

4. Apparatus for detection of the volume of molten level within a crucible comprising:
   (a) induction coil heating means surrounding said crucible for heating said metal;
   (b) power supply means for said induction coil, including:
      (i) compensating means for compensating for power dissipation variations in said induction coil caused by variations in the volume of said molten metal;
      (ii) frequency varying means for varying the frequency of power supplied to said induction coil thereby to compensate for said power dissipation variations; and
   (c) frequency detecting means for detecting the frequency of said power supplied to said induction coil.

5. The apparatus of claim 4 wherein said frequency detecting means further comprises generating means for generating a signal indicative of said frequency for display on a display means.

6. The apparatus of claim 5 wherein said display means includes indicia for displaying said volume in terms of the level of molten metal within said crucible 7. The apparatus of claim 4 wherein said frequency varying means comprises means for maintaining a constant power factor for said induction coil by varying the frequency of power supplied to said induction coil.

8. The apparatus of claim 4 wherein said frequency varying means comprises a variable frequency inverter in said power supply means.

9. A method for detecting the volume of molten metal in a crucible heated by an induction coil powered by a variable frequency power supply comprising the steps of:
   (a) varying the frequency of power supplied to said induction coil to compensate for variations in apparent coil inductance or resistance due to changes in volume of the metal heated by said induction coil;
   (b) detecting the frequency variations in said power supplied to said induction coil.

10. The method of claim 9 wherein said detecting step further comprises the step of detecting the frequency of said power supplied to said induction coil.

11. The method of claim 9 further comprising the step of displaying the volume of metal in said crucible.

* * * * *